(12) United States Patent
Hwang et al.

(10) Patent No.: US 11,331,661 B2
(45) Date of Patent: May 17, 2022

(54) FLUID ANALYSIS CARTRIDGE, AND FLUID ANALYSIS APPARATUS INCLUDING SAME

(71) Applicant: SAMSUNG ELECTRONICS CO., LTD., Suwon-si (KR)

(72) Inventors: Kyu Youn Hwang, Sejong (KR); Young Seop Seong, Ansan-si (KR); Jong Myeon Park, Seongnam-si (KR); Jeo Young Shim, Yongsin-si (KR); Do Gyoon Kim, Seongnam-si (KR); Jae Sung Lee, Suwon-si (KR); Hae Seok Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 590 days.

(21) Appl. No.: 15/778,574

(22) PCT Filed: Nov. 17, 2016

(86) PCT No.: PCT/KR2016/013279
§ 371 (c)(1),
(2) Date: May 23, 2018

(87) PCT Pub. No.: WO2017/095047
PCT Pub. Date: Jun. 8, 2017

(65) Prior Publication Data
US 2018/0345273 A1 Dec. 6, 2018

(30) Foreign Application Priority Data
Dec. 3, 2015 (KR) .................. 10-2015-0171440

(51) Int. Cl.
*B01L 3/00* (2006.01)
*G01N 35/00* (2006.01)
*B01D 39/20* (2006.01)

(52) U.S. Cl.
CPC .......... *B01L 3/502* (2013.01); *B01D 39/2017* (2013.01); *B01L 3/502746* (2013.01);
(Continued)

(58) Field of Classification Search
CPC ............... B01L 3/502; B01L 3/502746; B01L 2400/0487; B01L 2200/06;
(Continued)

(56) References Cited

U.S. PATENT DOCUMENTS

2010/0159574 A1 6/2010 Shin et al.
2011/0005932 A1 1/2011 Jovanovich et al.
(Continued)

FOREIGN PATENT DOCUMENTS

EP 1 500 937 A1 1/2005
KR 10-2012-0031218 A 3/2012
(Continued)

OTHER PUBLICATIONS

International Search Report dated Mar. 6, 2017 by the International Searching Authority in counterpart International Patent Application No. PCT/KR2016/013279. (PCT/ISA/210).
(Continued)

*Primary Examiner* — Dennis White
(74) *Attorney, Agent, or Firm* — Sughrue Mion, PLLC

(57) ABSTRACT

A fluid analysis cartridge having an improved structure in order to increase test reliability, and a fluid analysis apparatus including the same are disclosed. The fluid analysis apparatus comprises: a housing having a fluid supply part for supplying a fluid sample, and a filter member arranged such that the fluid sample supplied to the fluid supply part passes therethrough; a fluid analysis cartridge having a test unit that is connected to the housing so that the fluid sample that has passed through the filter member can be introduced and a test can be performed; and a pressure member that is
(Continued)

arranged to pressurize the fluid analysis cartridge in order to move the fluid sample supplied to the fluid supply part to the test unit, wherein the test unit includes a first panel that has a first inflow part facing the filter member, and a second panel that is arranged to face the first panel and that has a second inflow part corresponding to the first inflow part, and the first inflow part may have a smaller width than the second inflow part.

12 Claims, 17 Drawing Sheets

(52) U.S. Cl.
CPC .... *G01N 35/00029* (2013.01); *B01L 2200/06* (2013.01); *B01L 2300/0681* (2013.01); *B01L 2300/165* (2013.01); *B01L 2400/0487* (2013.01)

(58) Field of Classification Search
CPC ....... B01L 2300/0681; B01L 2300/165; G01N 35/00029; B01D 39/2017
See application file for complete search history.

(56) References Cited

U.S. PATENT DOCUMENTS

| | | | | |
|---|---|---|---|---|
| 2011/0194977 | A1* | 8/2011 | Miyamura | B01L 3/502738 422/68.1 |
| 2013/0112612 | A1* | 5/2013 | Blankenstein | G01N 1/28 210/472 |
| 2014/0017124 | A1* | 1/2014 | Lee | B01L 3/5023 422/69 |
| 2014/0252505 | A1 | 9/2014 | Kobayashi et al. | |
| 2015/0238954 | A1 | 8/2015 | Shimayama et al. | |
| 2016/0038934 | A1 | 2/2016 | Gweon et al. | |

FOREIGN PATENT DOCUMENTS

| | | |
|---|---|---|
| KR | 10-1135084 B1 | 4/2012 |
| KR | 10-2013-0117301 A | 10/2013 |
| KR | 10-2014-0147327 A | 12/2014 |
| KR | 10-2015-0059321 A | 6/2015 |
| KR | 10-2015-0101316 A | 9/2015 |
| KR | 10-2016-0018201 A | 2/2016 |
| WO | 2007/060523 A1 | 5/2007 |
| WO | 2012/004297 A1 | 1/2012 |

OTHER PUBLICATIONS

Written Opinion dated Mar. 6, 2017 by the International Searching Authority in counterpart International Patent Application No. PCT/KR2016/013279. (PCT/ISA/237).

Communication dated Mar. 10, 2021, issued by the European Patent Office in European Application No. 16870943.4.

Communication dated Feb. 28, 2022 issued by the Korean Intellectual Property Office in Korean Application No. 10-2015-0171440.

* cited by examiner

[Fig. 1]
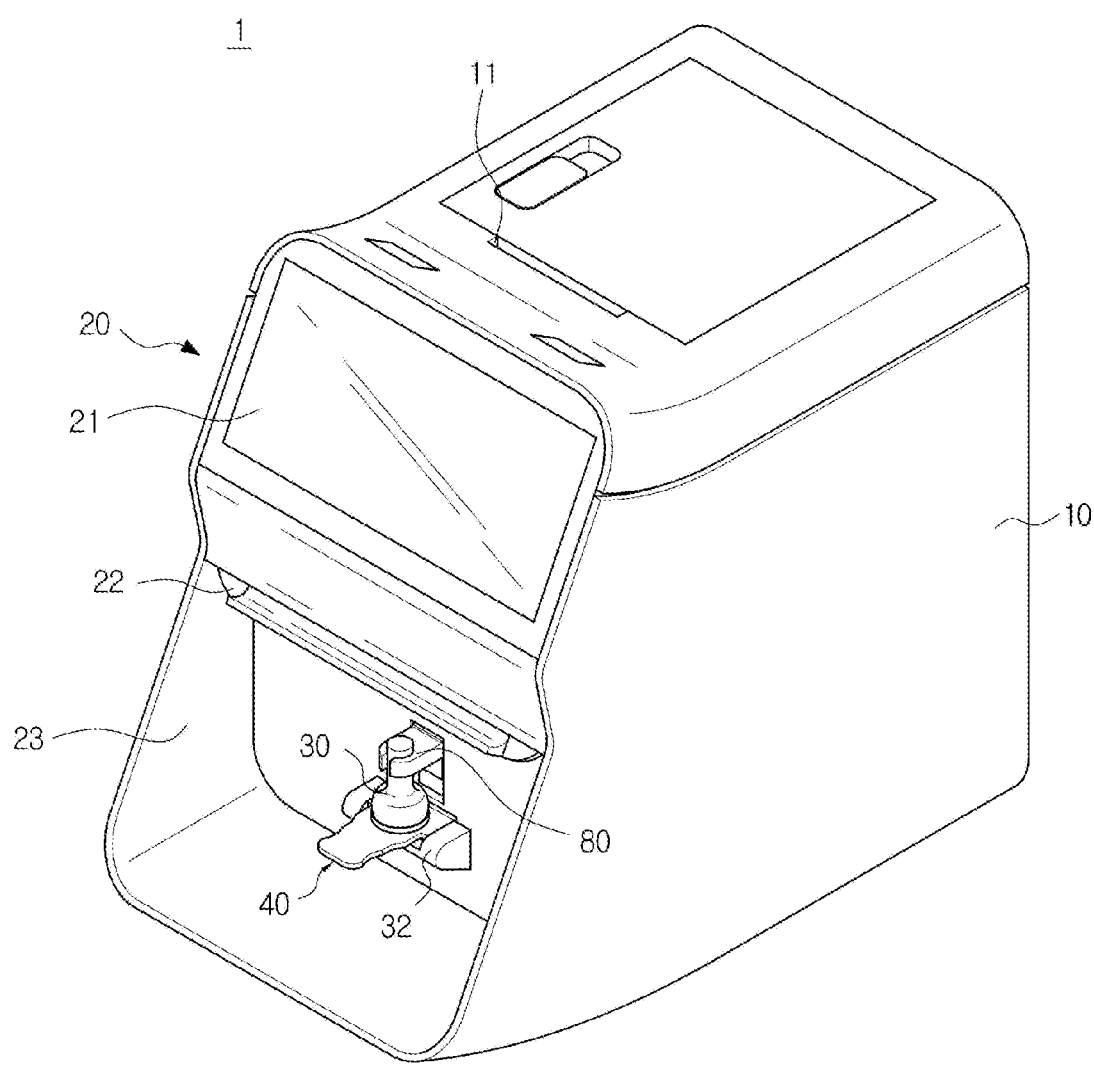

[Fig. 2]
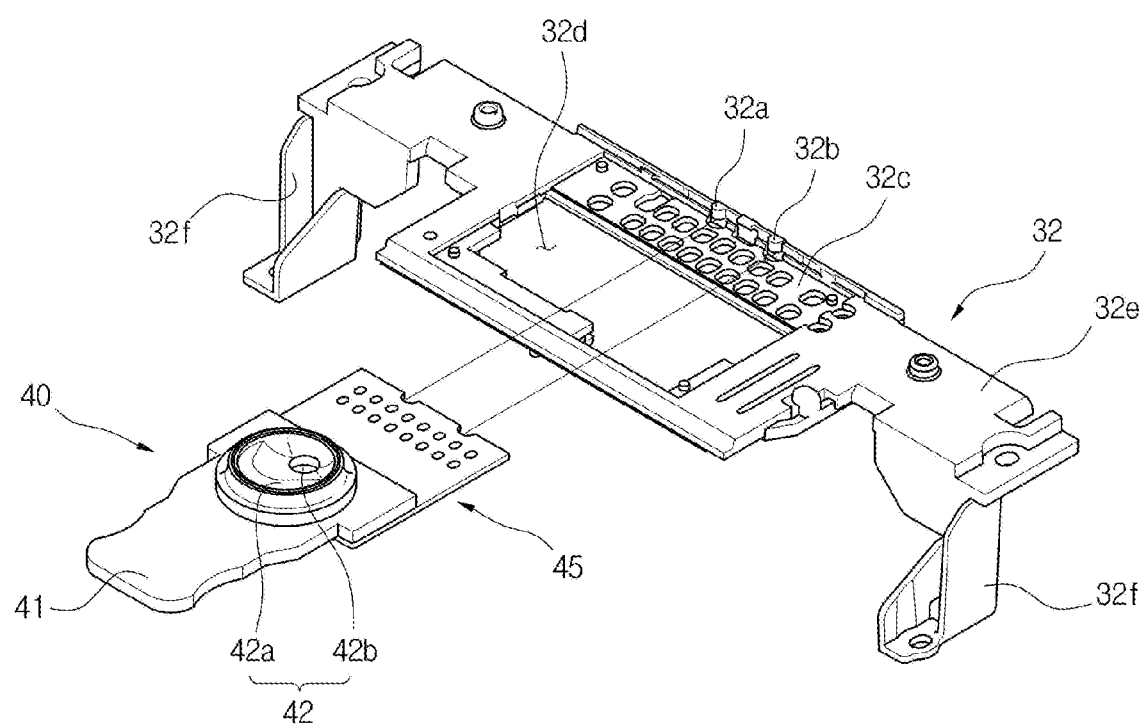

[Fig. 3]
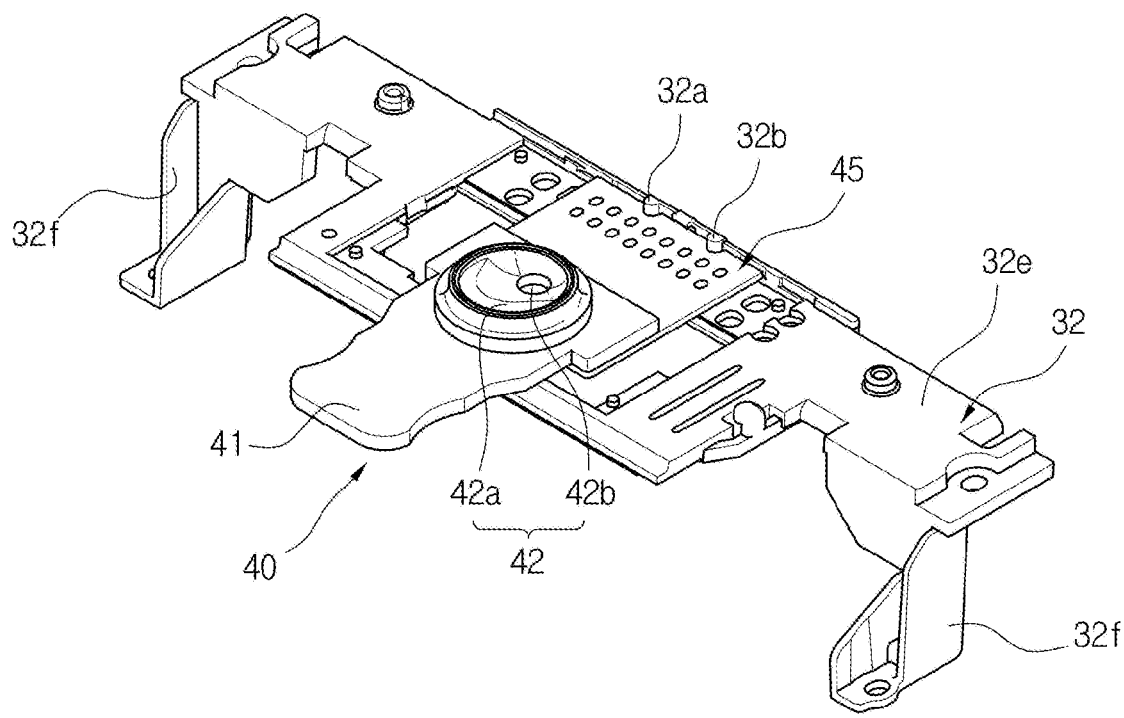

[Fig. 4]
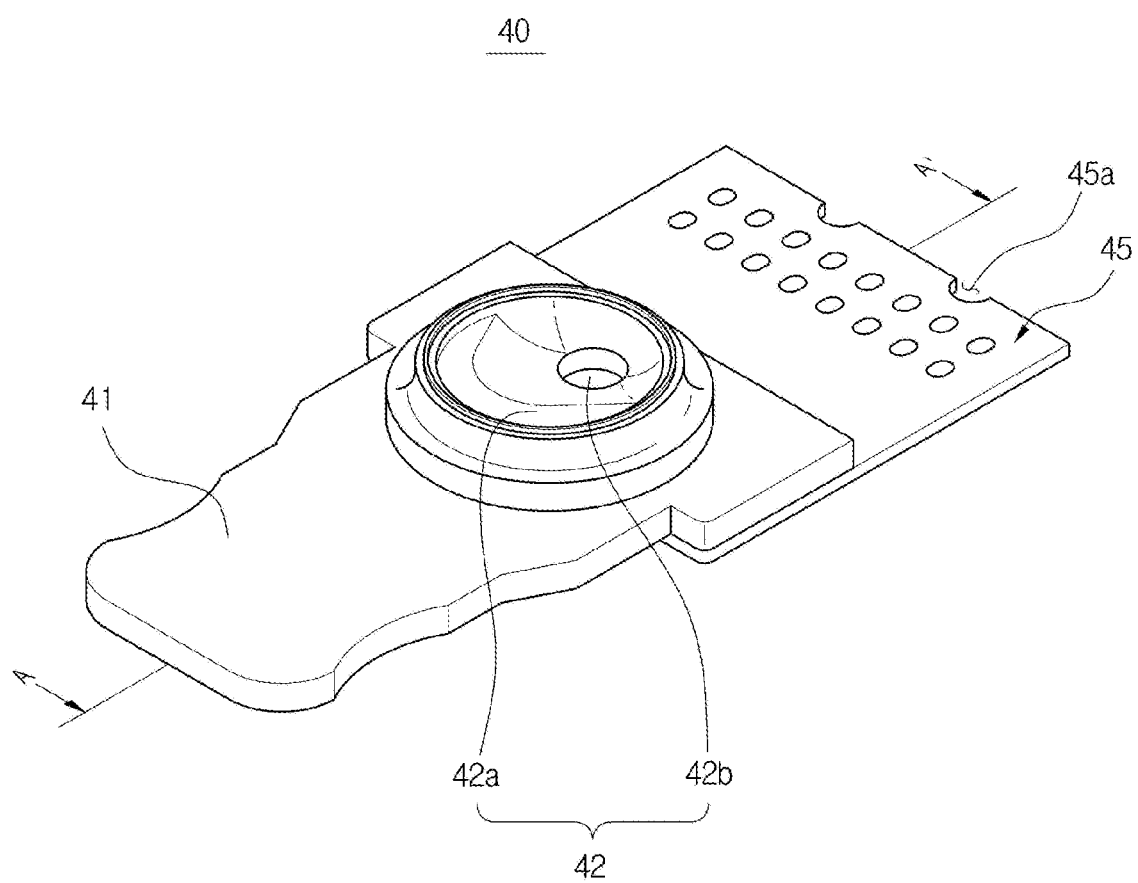

[Fig. 5]
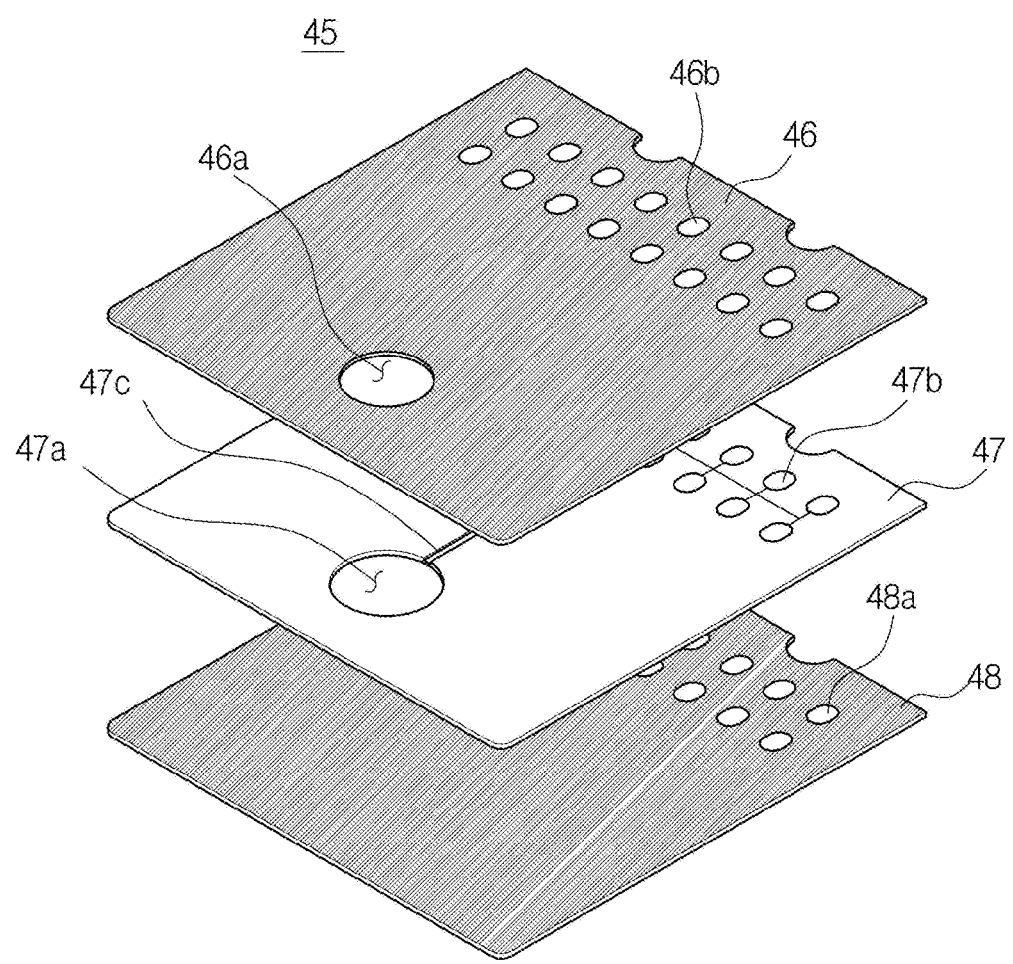

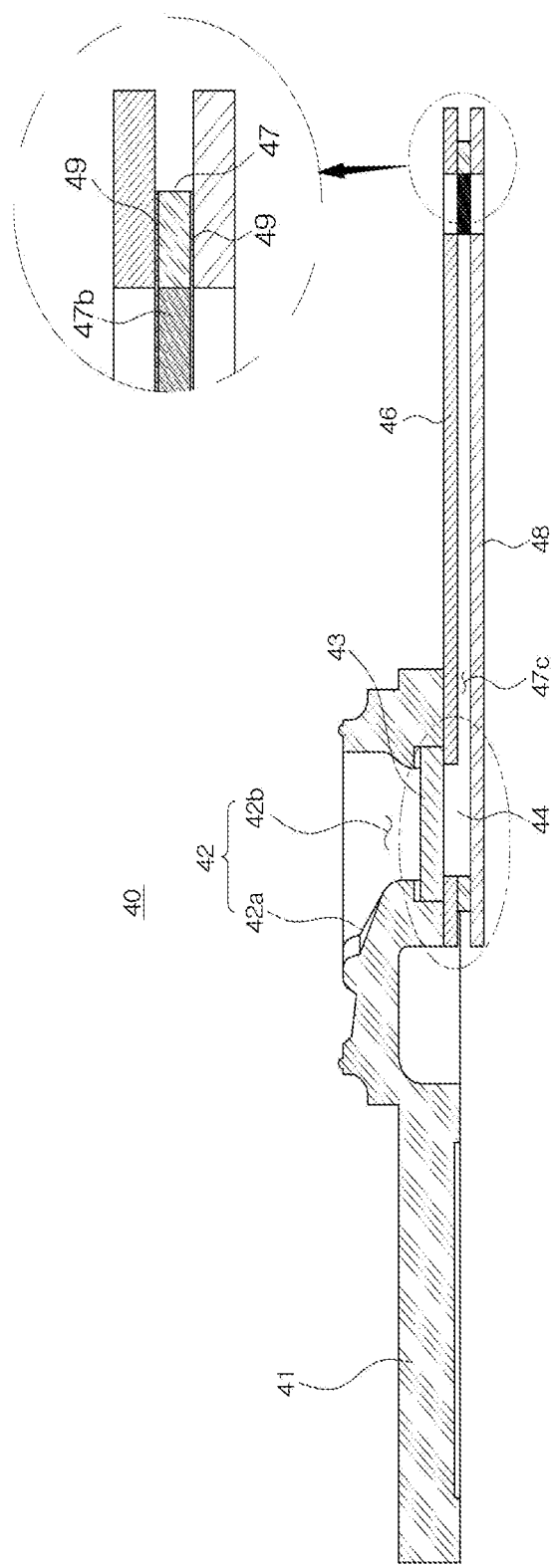
[Fig. 6]

[Fig. 7]
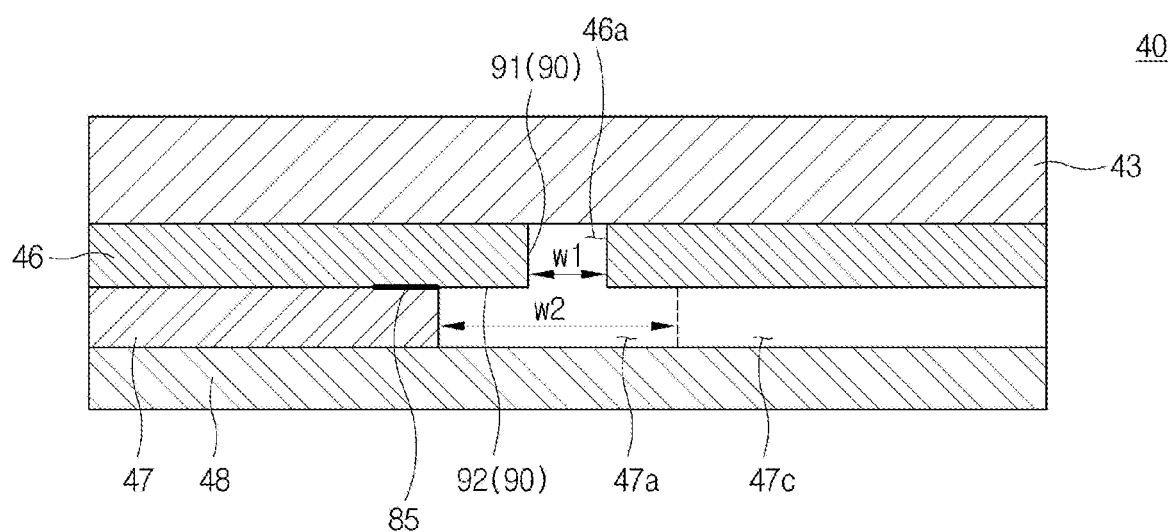

[Fig. 8]
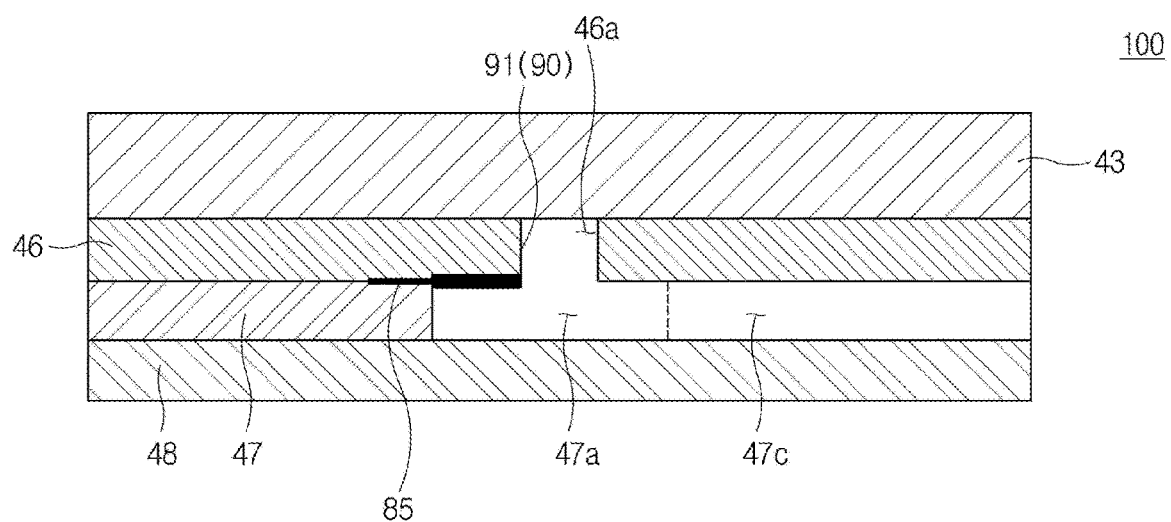

[Fig. 9]
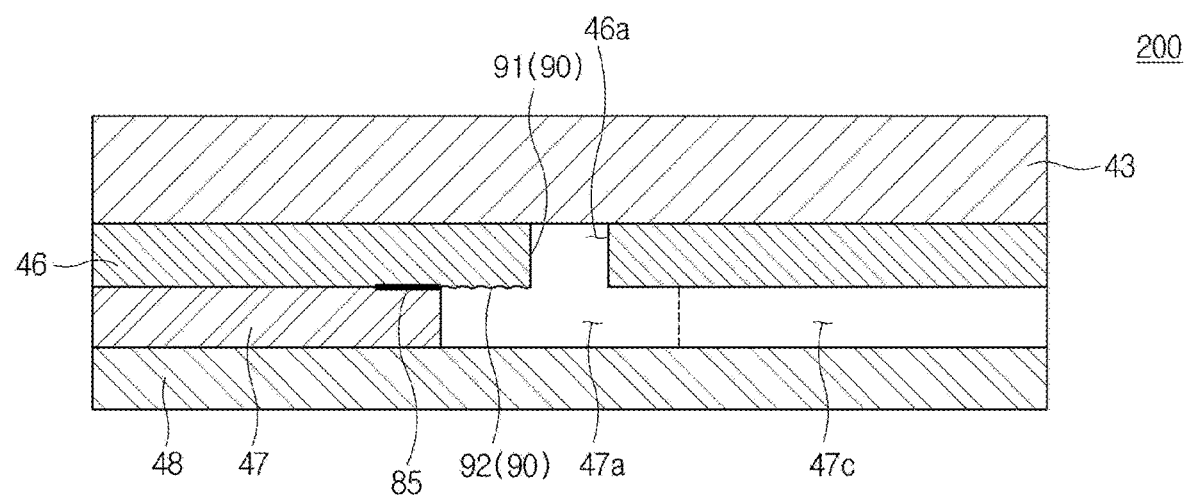

[Fig. 10]
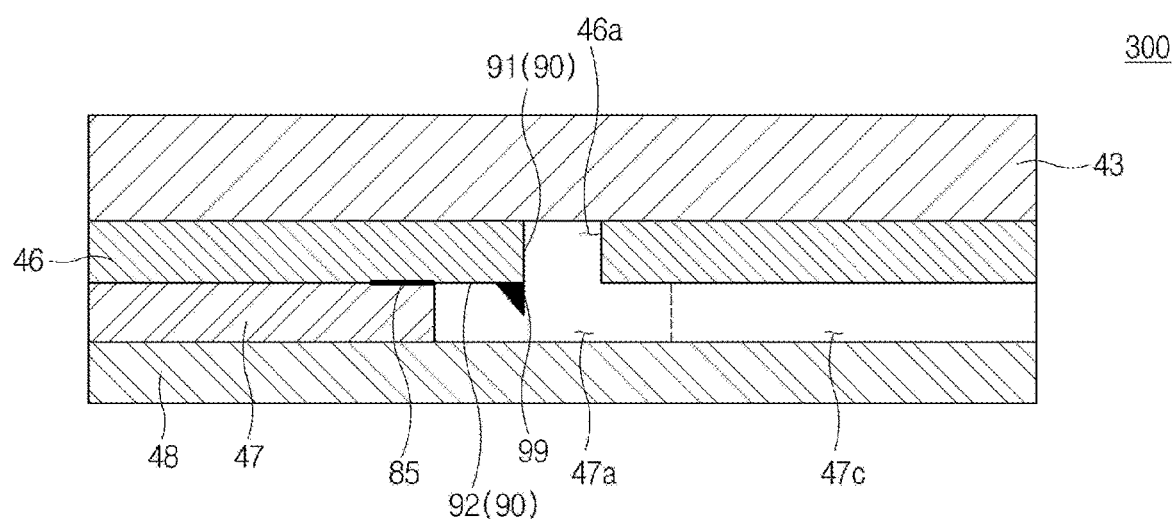

[Fig. 11]
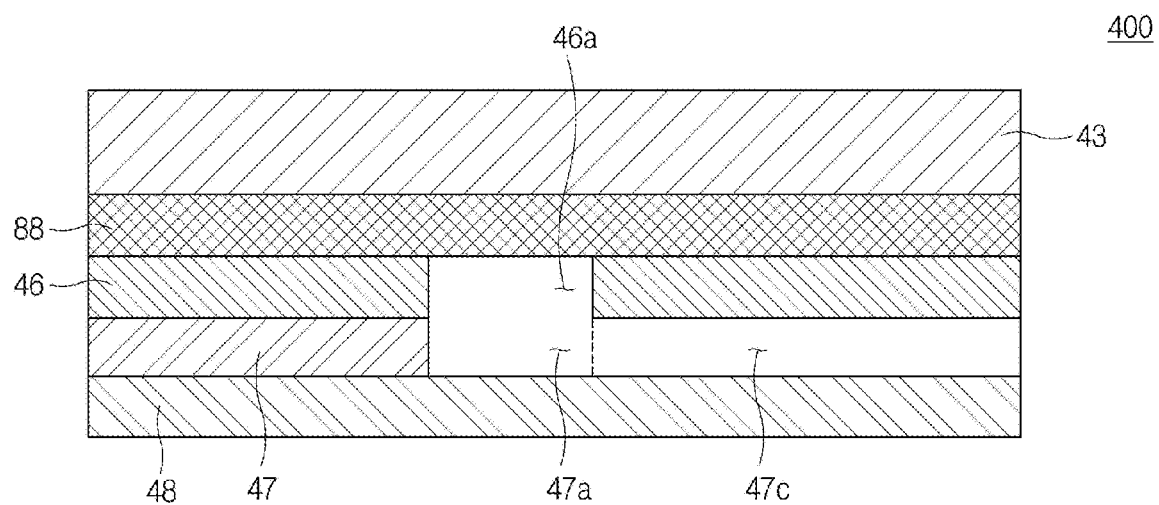

[Fig. 12]
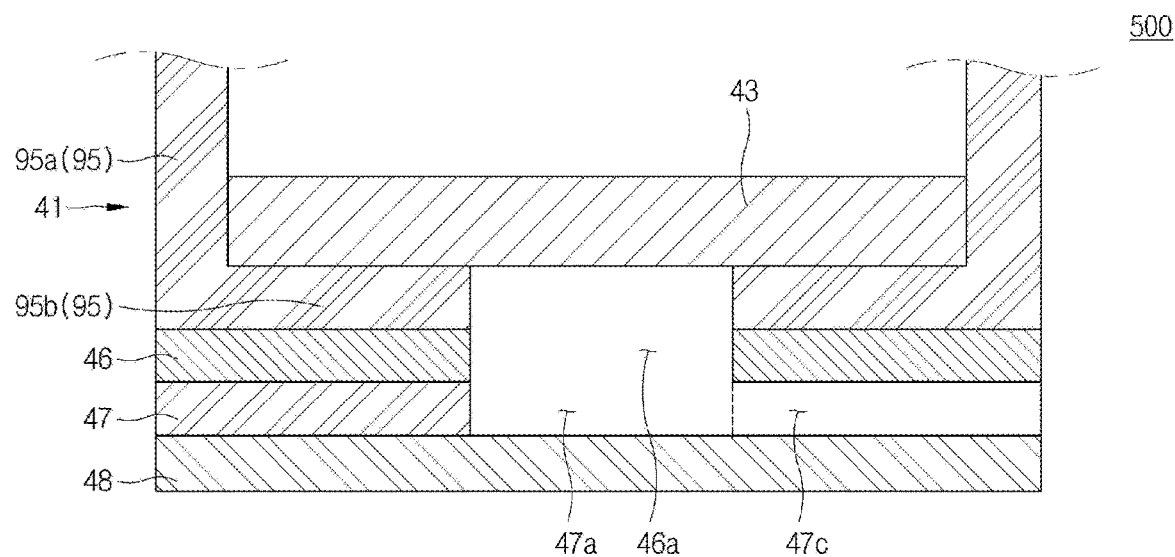

[Fig. 13]
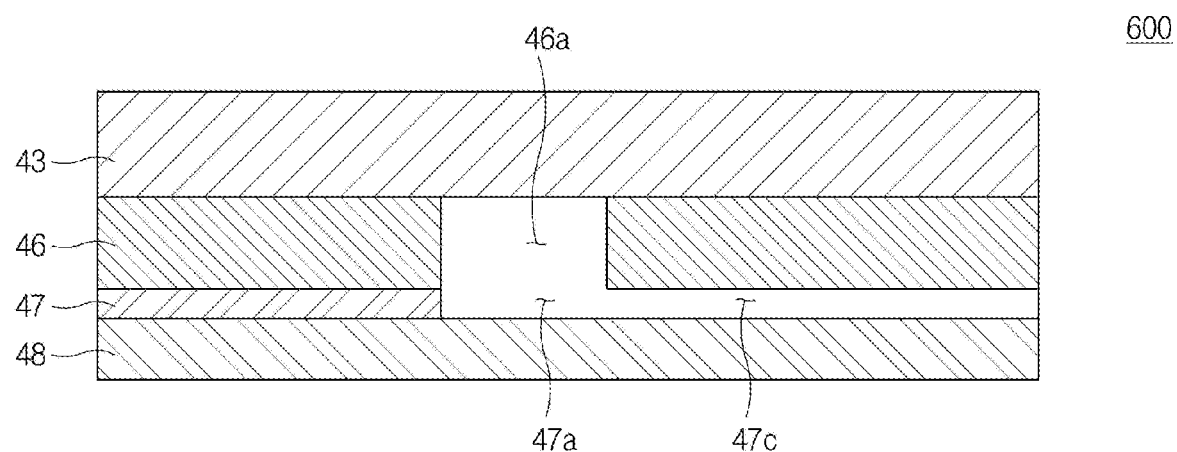

[Fig. 14]
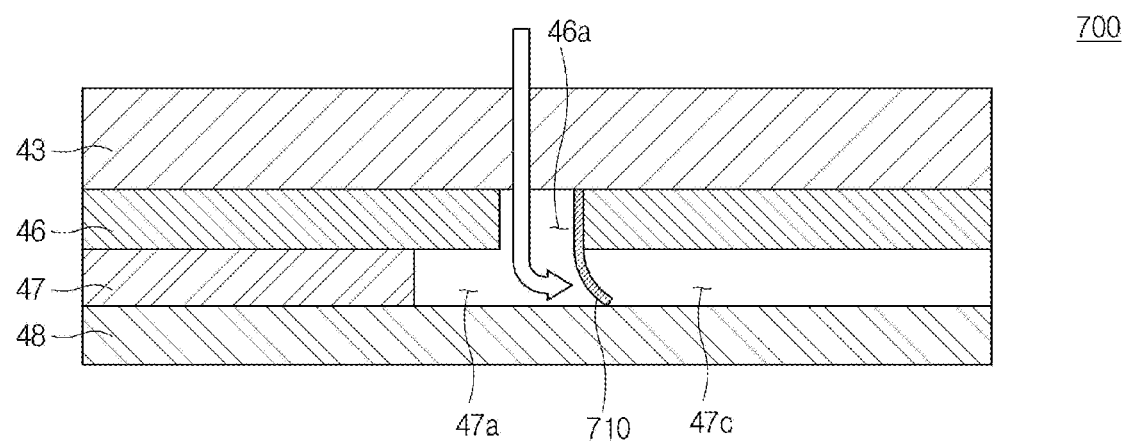

[Fig. 15]
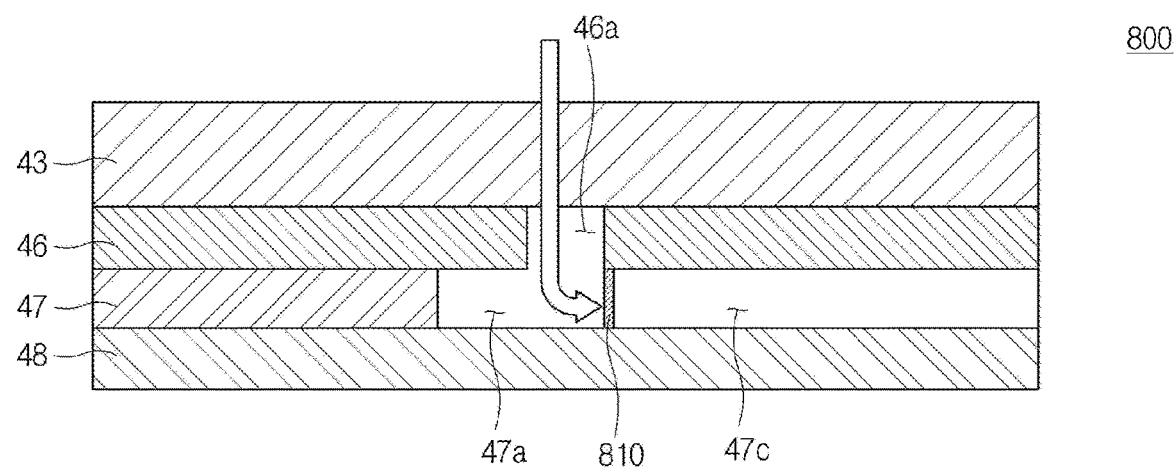

[Fig. 16]
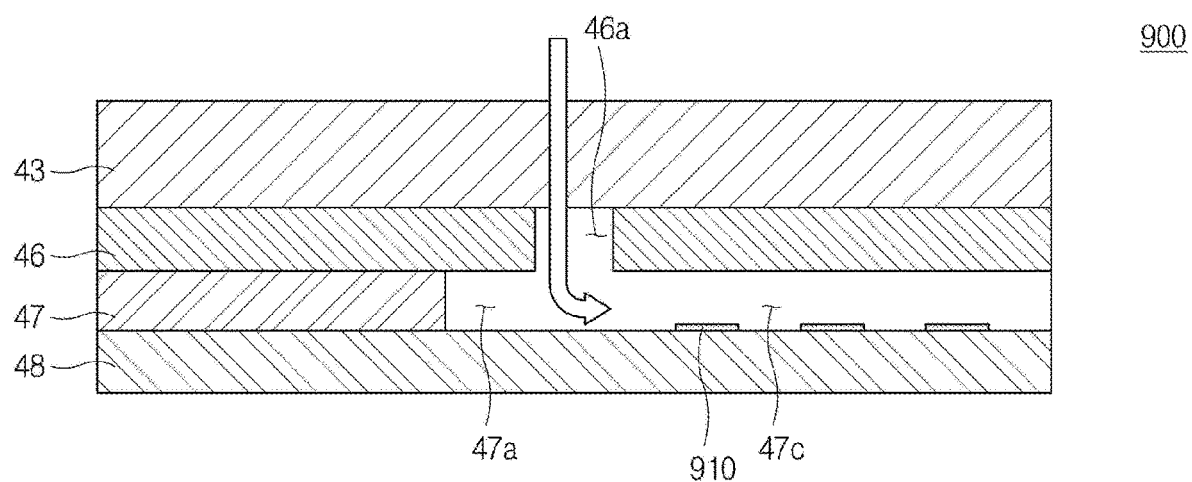

[Fig. 17]
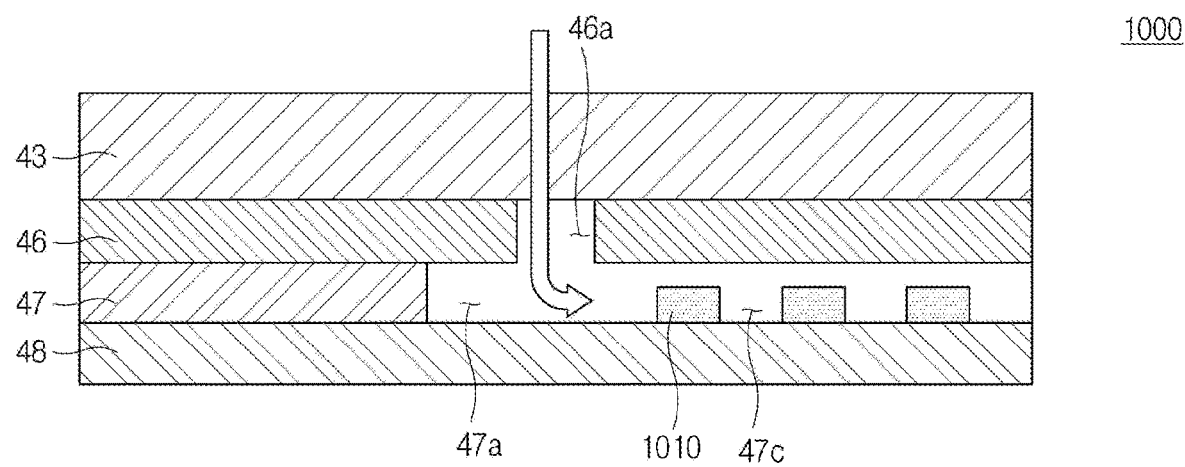

FLUID ANALYSIS CARTRIDGE, AND FLUID ANALYSIS APPARATUS INCLUDING SAME

TECHNICAL FIELD

The present invention relates to a fluid analysis cartridge and a fluid analysis apparatus including the same, and more particularly, to a fluid analysis cartridge having an improved structure for enhancing inspection reliability, and a fluid analysis apparatus including the same.

BACKGROUND ART

An apparatus and a method for analyzing a fluid sample are necessary in various fields such as environmental monitoring, food inspection, medical diagnosis, and the like. In the related art, to perform an inspection according to predetermined protocols, a variety of steps such as reagent injections, mixing operations, separating and moving operations, reacting operations, centrifugal separating operations, and the like has been manually performed by skilled experimenters which may cause errors in an inspection result.

To solve the above problem, a compact and automated apparatus for quickly analyzing a material to be inspected has been developed. Particularly, since a portable fluid analysis cartridge can quickly analyze a fluid sample without regard to place, when a structure and function of the portable fluid analysis cartridge are improved, it may perform a wider variety of functions in a wider range of fields. Accordingly, it is necessary to study and develop the portable fluid analysis cartridge. Also, an unskilled person may easily perform an inspection.

However, since it is necessary to perform an inspection in a fluid analysis cartridge having a minute channel using a small amount of a fluid sample, a capillary phenomenon or surface tension may have a considerable effect on an inspection result.

A variety of external forces which cause a fluid sample to move in an unintentional direction may be applied to a fluid analysis cartridge. The variety of external forces may cause a backflow of a fluid sample which is injected into a chamber in which an inspectional reaction is performed. In detail, when a negative pressure or a capillary phenomenon occurs in the fluid analysis cartridge, the fluid sample may flow back from the chamber in which the inspectional reaction is performed. When the fluid sample injected into the fluid analysis cartridge flows back, the accuracy of the inspection may greatly decrease. In the related art, a valve for controlling a fluid is used for preventing a fluid sample which is injected into a fluid analysis cartridge from flowing back. However, it is difficult to apply the valve for controlling a fluid to a fluid analysis cartridge in consideration of a cost and performance thereof.

DISCLOSURE OF THE INVENTION

Technical Problem

The present invention is directed to providing a fluid analysis cartridge having an improved structure capable of preventing a backflow phenomenon of an injected fluid sample, and a fluid analysis apparatus including the same.

Technical Solution

According to one aspect of the present invention, a fluid analysis apparatus includes a fluid analysis cartridge which includes a housing including a fluid supply portion configured to supply a fluid sample and a filter member disposed to allow the fluid sample supplied to the fluid supply portion to pass therethrough, and an inspection unit coupled to the housing to allow the fluid sample which has passed through the filter member to flow therein to be inspected, and the apparatus includes a pressurizing member disposed to pressurize the fluid analysis cartridge to move the fluid sample which is supplied to the fluid supply portion to the inspection unit. Here, the inspection unit includes a first plate having a first inlet portion which faces the filter member and a second plate disposed to face the first plate and having a second inlet portion corresponding to the first inlet portion. Also, the first inlet portion has a smaller width than that of the second inlet portion.

The inspection unit may further include a fluid sample movement path formed along a surface of the first plate, which is adjacent to the first inlet portion and the second inlet portion, and configured to prevent the fluid sample supplied to the inspection unit from flowing back.

At least a part of the fluid sample movement path may have a hydrophobic property.

The fluid sample movement path may include a first part, which forms the first inlet portion, and a second part, which faces the second inlet portion and is connected to the first part, and at least a part of the second part may be coated with a hydrophobic material.

At least a part of the fluid sample movement path may have unevenness formed thereon.

At least a part of the fluid sample movement path may have at least one backflow-preventing protrusion formed thereon, which protrudes toward at least one of the first inlet portion and the second inlet portion.

The filter member may include glass fiber.

The inspection unit may further include a micro space formed between the first plate and the second plate.

The inspection unit may further include a fluid sample movement path which is formed along a surface of the first plate to connect the micro space to the filter member and has at least a part having a hydrophobic property to prevent the fluid sample accommodated in the micro space from flowing back toward the filter member.

According to one aspect of the present invention, a fluid analysis apparatus includes a fluid analysis cartridge which includes a housing including a fluid supply portion configured to supply a fluid sample and a filter member disposed to allow the fluid sample supplied to the fluid supply portion to pass therethrough, and an inspection unit coupled to the housing to allow the fluid sample which has passed through the filter member to flow therein to be inspected, and the apparatus includes a pressurizing member disposed to pressurize the fluid analysis cartridge to move the fluid sample which is supplied to the fluid supply portion to the inspection unit. Here, the inspection unit includes a first plate, a second plate disposed to face the first plate and on which a flow path is provided through which the fluid sample which has flowed into the inspection unit moves, and an insertion member disposed in at least one of a space between the filter member and the first plate and a space between the first plate and the second plate.

The insertion member may be coupled to the first plate to face the filter member.

The insertion member may be coupled to the housing to be located between the filter member and the first plate.

The insertion member may include at least one of a porous support, a hydrophobic filter, and an O-ring.

The housing may further include a filter member seating portion on which the filter member is seated. Here, when the inspection unit is coupled to the housing, the insertion member may correspond to the filter member seating portion located between the filter member and the first plate.

The filter member may include glass fiber.

According to one aspect of the present invention, a fluid analysis cartridge includes a housing including a fluid supply portion configured to supply a fluid sample and a filter member disposed to allow the fluid sample supplied to the fluid supply portion to pass therethrough, and an inspection unit coupled to the housing to allow the fluid sample which has passed through the filter member to flow therein to be inspected. Here, the inspection unit includes a first plate having a first inlet portion which faces the filter member, a second plate disposed to face the first plate and having a second inlet portion corresponding to the first inlet portion and an inspection portion in which an inspection is performed, and a flow path which is provided on the second plate to allow the fluid sample to move and connects the second inlet portion to the inspection portion. Also, the flow path has a backflow-preventing structure formed thereon to prevent the fluid sample which has flowed into the flow path from flowing back toward the filter member.

The backflow-preventing structure may include a first backflow-preventing structure coupled to the first plate and configured to selectively open the flow path.

The first backflow-preventing structure may include a flexible polymer membrane.

The backflow-preventing structure may include a second backflow-preventing structure having a hydrophobic property.

The inspection unit may further include a third plate disposed to face the first plate with the second plate disposed therebetween and configured to form a bottom surface of the flow path. Here, the second backflow-preventing structure may be coupled to at least one of the first plate and the third plate to be adjacent to the second inlet portion.

The second backflow-preventing structure may be integrally formed with the second plate, on which the flow path is provided.

The inspection unit may further include a third plate disposed to face the first plate with the second plate disposed therebetween and configured to form a bottom surface of the flow path. Here, the backflow-preventing structure may include a third backflow-preventing structure formed by coating at least a part of the bottom surface of the flow path with a hydrophobic material.

The inspection unit may further include a third plate disposed to face the first plate with the second plate disposed therebetween and configured to form a bottom surface of the flow path. Here, the backflow-preventing structure may include a fourth backflow-preventing structure formed on the bottom surface of the flow path to protrude toward the flow path.

The fourth backflow-preventing structure may be integrally formed with the third plate, which forms the bottom surface of the flow path.

The filter member may include glass fiber.

Advantageous Effects

An inspection unit of a fluid analysis cartridge is configured to allow a first inlet portion of a first plate to have a smaller width than that of a second inlet portion of a second plate such that a fluid sample which has flowed into the inspection unit may be prevented from flowing back toward a filter member along a fluid sample movement path.

At least a part of a second part of the fluid sample movement path is coated with a hydrophobic material such that the fluid sample may be prevented from flowing back toward the filter member through the second part.

At least a part of the fluid sample movement path has unevenness or at least one backflow-preventing protrusion formed thereon such that the fluid sample which has flowed into the inspection unit may be prevented from flowing back toward the filter member.

To constantly prevent the filter member from coming into contact with the second plate regardless of whether the fluid sample passes therethrough, the inspection unit is designed to allow a distance degree d1 between a bottom surface of the filter member and a top surface of the second plate to be greater than a degree d2 in which the bottom surface of the filter member is deformed in the direction of gravity as the fluid sample passes therethrough on the basis of the bottom surface of the filter member before the fluid sample passes therethrough such that the fluid sample present in the second inlet portion of the second plate or a flow path may be prevented from flowing back toward the filter member due to a capillary phenomenon of the filter member.

A variety of backflow-preventing structures are applied to the flow path such that the fluid sample which has flowed into the flow path may be prevented from flowing back toward the filter member.

BRIEF DESCRIPTION OF THE DRAWINGS

FIG. 1 is a perspective view illustrating an external shape of a fluid analysis apparatus according to one embodiment of the present invention.

FIG. 2 is a perspective view illustrating a state in which a mounting member and a fluid analysis cartridge of the fluid analysis apparatus are separated from each other according to one embodiment of the present invention.

FIG. 3 is a perspective view illustrating a state in which the mounting member and the fluid analysis cartridge of the fluid analysis apparatus are coupled to each other according to one embodiment of the present invention.

FIG. 4 is a perspective view illustrating the fluid analysis cartridge according to a first embodiment of the present invention.

FIG. 5 is an exploded view illustrating an inspection unit of the fluid analysis cartridge according to the first embodiment of the present invention.

FIG. 6 is a cross-sectional view illustrating the inspection unit of the fluid analysis cartridge according to the first embodiment of the present invention, taken along line A-A' of FIG. 4.

FIG. 7 is an enlarged cross-sectional view illustrating a part shown in FIG. 6.

FIG. 8 is a cross-sectional view illustrating a part of a fluid analysis cartridge according to a second embodiment of the present invention.

FIG. 9 is a cross-sectional view illustrating a part of a fluid analysis cartridge according to a third embodiment of the present invention.

FIG. 10 is a cross-sectional view illustrating a part of a fluid analysis cartridge according to a fourth embodiment of the present invention.

FIG. 11 is a cross-sectional view illustrating a part of a fluid analysis cartridge according to a fifth embodiment of the present invention.

FIG. 12 is a cross-sectional view illustrating a part of a fluid analysis cartridge according to a sixth embodiment of the present invention.

FIG. 13 is a cross-sectional view illustrating a part of a fluid analysis cartridge according to a seventh embodiment of the present invention.

FIG. 14 is a cross-sectional view illustrating a part of a fluid analysis cartridge according to an eighth embodiment of the present invention.

FIG. 15 is a cross-sectional view illustrating a part of a fluid analysis cartridge according to a ninth embodiment of the present invention.

FIG. 16 is a cross-sectional view illustrating a part of a fluid analysis cartridge according to a tenth embodiment of the present invention.

FIG. 17 is a cross-sectional view illustrating a part of a fluid analysis cartridge according to an eleventh embodiment of the present invention.

BEST MODE FOR THE INVENTION

Hereinafter, exemplary embodiments of the present invention will be described in detail with reference to the attached drawings. Meanwhile, the terms used herein such as "a front end," "a rear end," "a top," "a bottom," "a top end," "a bottom end," and the like are defined on the basis of the drawings, shapes and positions of components are not restricted by the terms.

FIG. 1 is a perspective view illustrating an external shape of a fluid analysis apparatus according to one embodiment of the present invention.

As shown in FIG. 1, a fluid analysis apparatus 1 may include a casing 10 which forms an exterior, and a door module 20 provided on a front of the casing 10.

The door module 20 may include a display portion 21, a door 22, and a door frame 23. The display portion 21 and the door 22 may be arranged on a front of the door frame 23. The display portion 21 may be located above the door 22. The door 22 is provided to be slidable. The door 22 may be provided to be located in the rear of the display portion 21 when the door 22 is opened.

The display portion 21 may display information on a specimen analysis, a specimen analysis operation state, and the like. A mounting member 32 on which a fluid analysis cartridge 40, which accommodates a fluid specimen (a fluid sample), is mountable may be provided at the door frame 23. A user may slide up and open the door 22, mount the fluid analysis cartridge 40 on the mounting member 32, slide down and close the door 22, and then allow an analysis operation to be performed.

The fluid analysis apparatus 1 may further include the fluid analysis cartridge 40.

The fluid analysis cartridge 40 may be separably coupled to the fluid analysis apparatus 1.

The fluid sample is injected into the fluid analysis cartridge 40 and reacts with a reagent on an inspection unit 45. The fluid analysis cartridge 40 is inserted into the mounting member 32 and a pressurizing member 30 pressurizes the fluid analysis cartridge 40 so that the fluid sample in the fluid analysis cartridge 40 may flow into the inspection unit 45. The pressurizing member 30 may be coupled to a lever 80 of the fluid analysis apparatus 1.

The fluid analysis apparatus 1 may further include an output portion 11 which outputs an inspection result on a printed material in addition to the display portion 21.

The fluid analysis apparatus 1 may further include the pressurizing member 30. The pressurizing member 30 compresses and moves the fluid sample to the inspection unit 45. In other words, the pressurizing member 30 applies a pressure to the fluid sample to move the fluid sample to the inspection unit 45.

The pressurizing member 30 may be disposed to pressurize the fluid analysis cartridge 40. In detail, the pressurizing member 30 may be disposed to pressurize a fluid supply portion 42 (refer to FIG. 2). The pressurizing member 30 may be disposed to pressurize the fluid supply portion 42 to move the fluid sample supplied to the fluid supply portion 42 to the inspection unit 45. The pressurizing member 30 may vertically move to pressurize the fluid supply portion 42. To describe another aspect, the pressurizing member 30 may pressurize the fluid supply portion 42 using the principle of levers. The pressurizing member 30 may be coupled to a lever 80. The lever 80 may be coupled to a shaft (not shown) provided in the fluid analysis apparatus 1 and may vertically move. Accordingly, the pressurizing member 30 coupled to the lever 80 may vertically move with the lever 80 as a whole.

The pressurizing member 30 may be formed of at least one of an elastic material and a ductile material. As an example, the pressurizing member 30 may be formed of a rubber material.

FIG. 2 is a perspective view illustrating a state in which the mounting member and the fluid analysis cartridge of the fluid analysis apparatus are separated from each other according to one embodiment of the present invention, and FIG. 3 is a perspective view illustrating a state in which the mounting member and the fluid analysis cartridge of the fluid analysis apparatus are coupled to each other according to one embodiment of the present invention. FIG. 4 is a perspective view of the fluid analysis cartridge according to one embodiment of the present invention.

As shown in FIGS. 2 to 4, the fluid analysis cartridge 40 may be inserted into the mounting member 32 of the fluid analysis apparatus 1. The mounting member 32 may include a mounting portion 32c, on which the fluid analysis cartridge 40 is mounted, and a support portion 32f for supporting the mounting member 32 in the fluid analysis apparatus 1. The support portion 32f may be provided to extend toward both sides of a body 32e of the mounting member 32, and the mounting portion 32c may be provided in the middle of the body 32e. A slit 32d may be provided in the rear of the mounting portion 32c. The slit 32d is for preventing an error which occurs when a result of inspecting the fluid sample by the inspection unit 45 is measured.

The mounting member 32 may include contact portions 32a and 32b which come into contact with the fluid analysis cartridge 40, and the inspection unit 45 of the fluid analysis cartridge 40 may include recessed portions 45a having a shape corresponding to a shape of the contact portions 32a and 32b. The recessed portions 45a may come into contact with the contact portions 32a and 32b. The number of each of the recessed portions 45a and the contact portions 32a and 32b may be two but is not limited thereto.

The fluid analysis cartridge 40 may include a housing 41 which forms an exterior and the inspection unit 45 in which the fluid sample meets and reacts with the reagent.

The housing 41 may support the fluid analysis cartridge 40. Also, the housing 41 may include a grip portion to allow the user to grip the fluid analysis cartridge 40. The grip portion has a streamlined protrusion shape such that the user may stably grip the fluid analysis cartridge 40.

Also, the fluid supply portion 42 for supplying the fluid sample may be provided on the fluid analysis cartridge 40. In detail, the fluid supply portion 42 may be provided in the housing 41. The fluid supply portion 42 may include a supply hole 42b, through which the fluid sample flows into the inspection unit 45, and an auxiliary supply portion 42a which assists in supplying the fluid sample. A fluid sample capable of being inspected by the fluid analysis apparatus 1 is supplied to the fluid supply portion 42. Fluid samples which are objects for inspection may include, for example, biological samples such as blood, tissue fluids, body fluids including lymph, saliva, urine, and the like or environmental samples for water quality management or soil management but are not limited thereto.

The supply hole 42b may have a circular shape but is not limited thereto and may have a polygonal shape. The user may drop the fluid sample on the fluid supply portion 42 using a tool such as a pipet, dropper, or the like. The auxiliary supply portion 42a may be formed near the supply hole 42b to incline toward the supply hole 42b. Accordingly, the fluid sample dropped near the supply hole 42b may flow into the supply hole 42b along the incline. In detail, when the user precisely drops the fluid sample in the supply hole 42b such that a part of it is dripped near the supply hole 42b but not in the supply hole 42b, the fluid sample dropped on the periphery may flow into the supply hole 42b due to the incline of the auxiliary supply portion 42a.

Also, the auxiliary supply portion 42a may not only assist supplying of the fluid sample but also prevent the fluid analysis cartridge 40 from being contaminated by a wrongly supplied fluid sample. In detail, even when the fluid sample does not precisely flow into the supply hole 42b, the auxiliary supply portion 42a near the supply hole 42b prevents the fluid sample from flowing toward the inspection unit 45 or the grip portion such that contamination of the fluid analysis cartridge 40 by the fluid sample may be prevented. Also, the fluid sample which may be harmful to a human body may be prevented from coming into contact with the user.

The fluid supply portion 42 may include at least one supply hole 42b. When the fluid supply portion 42 includes a plurality of such supply holes 42b, it is possible to inspect a plurality of different fluid samples in one fluid analysis cartridge 40 at the same time. Here, the plurality of different fluid samples may be the same type but come from different sources. Otherwise, both types and sources may be different. Otherwise, both types and sources may be the same but states thereof may be different.

Since the housing 41 has a shape for embodying a particular function and sometimes comes into contact with the fluid sample, the housing 41 may be formed of an easily molded and chemically and biologically inert material. For example, the housing 41 may be formed of a variety of materials such as acryl including poly(methyl methacrylate) (PMMA) and the like, polysiloxane including polydimethylsiloxane (PDMS) and the like, polyethylene including polycarbonate (PC), linear low density polyethylene (LLDPE), low density polyethylene (LDPE), medium density polyethylene (MDPE), high density polyethylene (HDPE), and the like, a plastic material including polyvinylalcohol (PVA), very low density polyethylene (VLDPE), polypropylene (PP), acrylonitrile butadiene styrene (ABS), cyclic olefin copolymer (COC), and the like, glass, mica, silica, a semiconductor wafer, and the like. However, the above-mentioned materials are merely examples as a material of the housing 41, and embodiments of the present invention are not limited thereto. Any materials having chemical and biological stability and mechanical processability may be used as the materials of the housing 41 according to one embodiment of the present invention.

The inspection unit 45 may be provided at the fluid analysis cartridge 40 to be coupled or bonded. In other words, the inspection unit 45 may be coupled or bonded to the housing 41. The fluid sample injected through the fluid supply portion 42 may flow into the inspection unit 45 and a reaction between the fluid sample and the reagent happens in the inspection unit 45 such that an inspection may be performed. The inspection unit 45 may include an inspection portion 47b, and the inspection portion 47b may accommodate a reagent which reacts with a fluid.

FIG. 5 is an exploded view illustrating the inspection unit of the fluid analysis cartridge according to the first embodiment of the present invention.

As shown in FIG. 5, the inspection unit 45 of the fluid analysis cartridge 40 may have a structure formed of three bonded plates. The three plates may include a first plate 46, a second plate 47, and a third plate 48. The first plate 46 and the third plate 48 are coated with a light-shielding ink to protect a fluid sample which is moving toward the inspection portion 47b from external light or to prevent an error in measuring an optical property by the inspection portion 47b. Also, the first plate 46 and the third plate 48 are coated with a light-shielding film to protect a fluid sample which is moving toward the inspection portion 47b from external light or to prevent an error in measuring an optical property by the inspection portion 47b. The light-shielding film may include carbon. However, the first plate 46, the second plate 47, and the third plate 48 may be integrally formed.

A film used for forming the first plate 46 and the third plate 48 of the inspection unit 45 may be selected from polyethylene films such as VLDPE, LLDPE, LDPE, MDPE, HDPE, and the like, a PP film, a polyvinyl chloride (PVC) film, a PVA film, a polystyrene (PS) film, and a polyethylene terephthalate (PET) film. However, these films are merely examples, and any films having chemically and biologically inertness and mechanical processability may be a film for forming the first plate 46 and the third plate 48 of the inspection unit 45.

The second plate 47 of the inspection unit 45 may be formed of a porous sheet unlike the first plate 46 and the third plate 48. As an example of a material of the porous sheet utilizable as the second plate 47, at least one of cellulose acetate, nylon 6.6, nylon 6.10, polyethersulfone (PES), polytetrafluoroethylene (PTFE), and polyvinylidene fluoride (PVDF) may be used. Since the second plate 47 is formed of the porous sheet, the second plate 47 functions as a vent and allows a fluid sample to move in inspection unit 45 without an additional driving source. Also, when a fluid sample has a hydrophilic property, the second plate 47 having a hydrophilic property may be coated with a hydrophobic solution to prevent the fluid sample from soaking through the second plate 47.

The first plate 46, the second plate 47, and the third plate 48 may be formed in a stacked structure.

The first plate 46 may be disposed below a filter member 43 (refer to FIG. 6). In other words, the first plate 46 may be disposed to be adjacent to the filter member 43. The second plate 47 may be disposed to face the first plate 46. The third plate 48 may be disposed to face the first plate 46 with the second plate 47 disposed therebetween. That is, the second plate 47 may be disposed between the first plate 46 and the third plate 48.

A first inlet portion 46a, through which the fluid sample flows therein, may be formed in the first plate 46, and an area 46b corresponding to the inspection portion 47b may be treated to be transparent. At least one first inlet portion 46a, through which the fluid sample flows therein may be formed in the first plate 46. An area 48a of the third plate 48 which corresponds to the inspection portion 47b may be treated to be transparent in order to measure optical absorbance of a reaction which occurs in the inspection portion 47b, that is, an optical property.

A second inlet portion 47a for allowing the fluid sample to flow therein is formed in the second plate 47 and the first inlet portion 46a of the first plate 46 overlaps the second inlet portion 47a of the second plate 47 such that an inlet portion 44 (refer to FIG. 6) of the inspection unit 45 is formed. At least one second inlet portion 47a for allowing the fluid sample to flow therein may be formed in the second plate 47 to correspond to the first inlet portion 46a. As will be described below, the first inlet portion 46a may have a smaller width than that of the second inlet portion 47a. In other words, the at least one first inlet portion 46a may have a smaller width than that of the at least one second inlet portion 47a. A variety of reactions for analyzing a fluid may occur in the inspection unit 45. When blood is a fluid sample, a reagent, which reacts to a particular component of the blood (particularly, plasma) and is colored or discolored, is accommodated in the inspection portion 47b such that a color formed in the inspection portion 47b may be optically detected and digitized. Through the detected digit, it is possible to check a ratio of the particular component or whether the particular component is present in the blood.

Also, a flow path 47c which connects the second inlet portion 47a to the inspection portion 47b may be formed in the second plate 47.

FIG. 6 is a cross-sectional view illustrating the inspection unit of the fluid analysis cartridge according to the first embodiment of the present invention, taken along line A-A' of FIG. 4, and FIG. 7 is an enlarged cross-sectional view illustrating a part shown in FIG. 6.

As shown in FIGS. 6 to 7, the fluid analysis cartridge 40 may be formed by bonding the inspection unit 45 to a bottom of the housing 41. In detail, the inspection unit 45 may be bonded to a bottom of the fluid supply portion 42 at which the supply hole 42b is provided. Pressure sensitive adhesives (PSA) may be used for bonding between the housing 41 and the inspection unit 45. The PSA have properties capable of being adhered to an adherend in a short time by a small pressure such as finger pressure at room temperature and without causing a cohesive failure and a residue on a surface of the adherend when separated. However, the housing 41 and the inspection unit 45 are not bonded by only the PSA and may be bonded by other double-sided adhesives in addition to the PSA or by being inserted into a groove.

The fluid sample, which has flowed therein through the supply hole 42b, passes through the filter member 43 and flows into the inspection unit 45 as shown in FIG. 6. The filter member 43 may be disposed in the housing 41 such that the fluid sample supplied to the fluid supply portion 42 passes therethrough. The filter member 43 may be inserted into the supply hole 42b of the housing 41.

The filter member 43 may include at least one porous membrane including a plurality of pores to filter out materials having a certain size or more in the fluid sample.

The filter member 43 may include glass fiber. The filter member 43 is not limited to the glass fiber and may include non-woven fabric, a paper filter, an absorbent filter, and the like. However, in the embodiment, the filter member 43 formed of the glass fiber will be described.

The inspection unit 45 may include the inlet portion 44 through which the fluid sample which has passed through the filter member 43 flows therein, the flow path 47c through which the fluid sample moves, and the inspection portion 47b in which a reaction between the fluid sample and the reagent occurs. The inlet portion 44 may include the first inlet portion 46a formed in the first plate 46 to face the filter member 43 and the second inlet portion 47a formed in the second plate 47 to correspond to the first inlet portion 46a. The flow path 47c and the inspection portion 47b may be formed on the second plate 47. A bottom surface of the first plate 46 may form surfaces, in detail, top surfaces of the flow path 47c and the inspection portion 47b, while a top surface of the third plate 48 may form other surfaces, in detail, bottom surfaces of the flow path 47c and the inspection portion 47b.

The first plate 46, the second plate 47, and the third plate 48 may be coupled by double-sided tapes. In detail, the double-sided tapes are attached to a top surface and a bottom surface of the second plate 47 such that the first plate 46, the second plate 47, and the third plate 48 may be coupled to one another.

In the embodiment, a case in which the first plate 46 and the third plate 48 include PET materials coated with carbon, the second plate 47 includes a cellulose acetate material, and the filter member 43 is formed of glass fiber will be described.

The fluid sample is compressed and supplied to the inspection unit 45 by the pressurizing member 30. However, a pressurizing force of the pressurizing member 30 is reduced by a variety of causes including foreign substances located on a contact surface between the pressurizing member 30 and the fluid supply portion 42 such that a negative pressure occurs in the fluid analysis cartridge 40 sometimes. The above phenomenon, like a capillary phenomenon in the fluid analysis cartridge 40, may allow the fluid sample, which flows into the fluid analysis cartridge 40, to flow back to the outside of the fluid analysis cartridge 40.

When a pressure P1 applied to the fluid sample by the pressurizing member 30 is higher than a water absorption force P2 of the filter member 43, the fluid sample may pass through the filter member 43 and flow into the inspection unit 45. However, although the pressure P1 applied to the fluid sample by the pressurizing member 30 is higher than the water absorption force P2 of the filter member 43 in the beginning, the water absorption force P2 of the filter member 43 becomes higher than the pressure P1 applied to the fluid sample by the pressurizing member 30 with a lapse of time. That is, the negative pressure may occur. In this case, the filter member 43 formed of glass fiber may additionally absorb the fluid sample which has already been supplied to the inspection unit 45 and may cause a backflow phenomenon of the fluid sample due to the capillary phenomenon. In addition, when the fluid sample is blood, the filter member 43 filters out blood corpuscles. Since the filter member 43 may be obstructed by blood corpuscles when the filter member 43 is thin, it is necessary to use the filter member 43 having an adequate thickness according to a volume of blood. However, as the thickness of the filter member 43 increases, water absorption capacity of the filter member 43 increases due to the capillary phenomenon. The increase in water absorption capacity of the filter member 43 may increase a possibility of a backflow of the fluid sample supplied to the inspection unit 45.

Also, in the inspection unit 45, for a reason of a manufacturing process of bonding the first plate 46 to the second plate 47 or bonding the second plate 47 to the third plate 48, a micro space 85 capable of causing the capillary phenomenon may be formed in a bonding interface between the first plate 46 and the second plate 47 or a bonding interface between the second plate 47 and the third plate 48. In other words, the micro space 85 capable of causing the capillary phenomenon may be formed in at least one of the bonding interface between the first plate 46 and the second plate 47 and the bonding interface between the second plate 47 and the third plate 48. The micro space 85 may include cracks or channels which may be formed in at least one of the bonding interface between the first plate 46 and the second plate 47 and the bonding interface between the second plate 47 and the third plate 48. The micro space 85 may also cause the backflow phenomenon of the fluid sample with the filter member 43. The backflow phenomenon of the fluid sample may have a considerable bad influence on inspection reliability. Accordingly, hereinafter, a variety of measures capable of preventing a backflow of a fluid sample supplied to the fluid analysis cartridge will be described.

As shown in FIG. 7, the first inlet portion 46a formed in the first plate 46 may have a smaller width than that of the second inlet portion 47a formed in the second plate 47. In FIG. 7, the width of the first inlet portion 46a is shown as "w1" and the width of the second inlet portion 47a is shown as "w2." Through a structure as described above, a phenomenon in which the fluid sample supplied to the inspection unit 45 flows back along a fluid sample movement path 90 may be prevented. Also, through the structure, contact between the filter member 43 and the second inlet portion 47a may be prevented.

The inspection unit 45 may further include the fluid sample movement path 90 formed along a surface of the first plate 46 adjacent to the first inlet portion 46a and the second inlet portion 47a and configured to prevent the fluid sample supplied to the inspection unit 45 from flowing back. At least a part of the fluid sample movement path 90 may have a hydrophobic property.

The fluid sample movement path 90 may further include a first part 91 and a second part 92. The first part 91 may form the first inlet portion 46a. In other words, the first part 91 may be formed on one surface of the first plate 46, which forms the first inlet portion 46a. The second part 92 may face the second inlet portion 47a and may be connected to the first part 91. In other words, the second part 92 may be formed on another surface of the first plate 46 which faces the second inlet portion 47a. The fluid sample movement path 90 may be bent at a connection part between the first part 91 and the second part 92.

The first part 91 and the second part 92 may have different affinities with the fluid sample. The second part 92 may have a hydrophobic property in comparison to the first part 91 due to properties of a material itself.

When the fluid sample is blood, the fluid sample has a hydrophilic property. To flow back, the fluid sample sequentially passes through the second part 92 and the first part 91 and reaches the filter member 43. Here, when the second part 92 has a hydrophobic property, it is difficult for the fluid sample to pass through the second part 92 such that the fluid sample may be prevented from flowing back.

To describe another aspect, the inspection unit 45 may include the micro space 85. The micro space 85 may have a volume large enough to cause the capillary phenomenon. The micro space 85 may be formed in at least one of a space between the first plate 46 and the second plate 47 and a space between the second plate 47 and the third plate 48. Hereinafter, a case in which the micro space 85 is formed between the first plate 46 and the second plate 47 will be described.

The inspection unit 45 may further include the fluid sample movement path 90. The fluid sample movement path 90 may be formed along the surface of the first plate 46 to connect the micro space 85 to the filter member 43. Also, at least a part of the fluid sample movement path 90 may have a hydrophobic property to prevent a fluid sample accommodated in the micro space 85 from flowing back toward the filter member 43. The fluid sample movement path 90 may include the first part 91 which forms the first inlet portion 46a and the second part 92 which faces the second inlet portion 47a and connects the micro space 85 to the first part 91. The second part 92 may have a hydrophobic property. When the inspection unit 45 is designed such that the first inlet portion 46a has a smaller width than that of the second inlet portion 47a, the fluid sample movement path 90 which connects the micro space 85 to the filter member 43 extends as a result in comparison to a case in which the inspection unit 45 is designed such that the first inlet portion 46a has a larger width than that of the second inlet portion 47a.

FIG. 8 is a cross-sectional view illustrating a part of a fluid analysis cartridge according to a second embodiment of the present invention. Hereinafter, a description which overlaps with that of the fluid analysis cartridge 40 according to the first embodiment will be omitted. Also, like reference numerals refer to like components described in relation to the fluid analysis cartridge 40 according to the first embodiment. In FIG. 8, the fluid analysis cartridge according to the second embodiment is referred to as "100."

As shown in FIG. 8, to give a hydrophobic property to a part of the fluid sample movement path 90, that is, the second part 92, at least a part of the second part 92 may be coated with a hydrophobic material. A reason of coating at least the part of the second part 92 with the hydrophobic material is like the above description with reference to FIG. 7.

FIG. 9 is a cross-sectional view illustrating a part of a fluid analysis cartridge according to a third embodiment of the present invention. Hereinafter, a description which overlaps with that of the fluid analysis cartridge 40 according to the first embodiment will be omitted. Also, like reference numerals refer to like components described in relation to the fluid analysis cartridge 40 according to the first embodiment. In FIG. 9, the fluid analysis cartridge according to the third embodiment is referred to as "200."

As shown in FIG. 9, unevenness may be formed on at least a part of the fluid sample movement path 90 may be formed unevenly. Preferably, the unevenness may be formed on the second part 92 of the fluid sample movement path 90. The unevenness may be micro unevenness. The micro unevenness may prevent a backflow of a fluid sample by causing a lotus effect.

FIG. 10 is a cross-sectional view illustrating a part of a fluid analysis cartridge according to a fourth embodiment of the present invention. Hereinafter, a description which overlaps with that of the fluid analysis cartridge 40 according to the first embodiment will be omitted. Also, like reference numerals refer to like components described in relation to the fluid analysis cartridge 40 according to the first embodiment. In FIG. 10, the fluid analysis cartridge according to the fourth embodiment is referred to as "300."

As shown in FIG. 10, at least one backflow-preventing protrusion 99 which protrudes toward at least one of the first inlet portion 46a and the second inlet portion 47a may be formed on at least a part of the fluid sample movement path 90. The at least one backflow-preventing protrusion 99 may function as an obstacle to a fluid sample which moves along the fluid sample movement path 90 to prevent a backflow of the fluid sample.

FIG. 11 is a cross-sectional view illustrating a part of a fluid analysis cartridge according to a fifth embodiment of the present invention, and FIG. 12 is a cross-sectional view illustrating a part of a fluid analysis cartridge according to a sixth embodiment of the present invention. FIG. 13 is a cross-sectional view illustrating a part of a fluid analysis cartridge according to a seventh embodiment of the present invention. Hereinafter, a description which overlaps with that of the fluid analysis cartridge 40 according to the first embodiment will be omitted. Also, like reference numerals refer to like components described in relation to the fluid analysis cartridge 40 according to the first embodiment. In FIG. 11, the fluid analysis cartridge according to the fifth embodiment is referred to as "400." In FIG. 12, the fluid analysis cartridge according to the sixth embodiment is referred to as "500." In FIG. 13, the fluid analysis cartridge according to the seventh embodiment is referred to as "600."

A distance degree d1 between a bottom surface of the filter member 43 and the top surface of the second plate 47 may be greater than a deformation degree d2 of the filter member 43 which may be deformed by a fluid sample. The filter member 43 may absorb the fluid sample passing through the filter member 43 and be deformed in the direction of gravity. In other words, the filter member 43 may absorb the fluid sample passing through the filter member 43 and may drop in the direction of gravity. When the filter member 43 is deformed in the direction of gravity as described above, the filter member 43 may come into contact with the second inlet portion 47a or the flow path 47c. When the filter member 43 comes into contact with the second inlet portion 47a or the flow path 47c, the fluid sample located at the second inlet portion 47a or the flow path 47c may flow back toward the filter member 43 due to the capillary phenomenon. To prevent a backflow phenomenon of the fluid sample as described above, it is necessary to design the inspection unit 45 to have an adequate distance between the bottom surface of the filter member 43 and the top surface of the second plate 47. In detail, it is necessary to design the inspection unit 45 such that the distance degree d1 between the bottom surface of the filter member 43 and the top surface of the second plate 47 is greater than the deformation degree d2 in which the bottom surface of the filter member 43 is deformed in the direction of gravity due to the fluid sample passing through, on the basis of the bottom surface of the filter member 43 before the fluid sample passes therethrough.

Hereinafter, with reference to FIGS. 11 to 13, structures for preventing a backflow of a fluid sample by increasing a distance between the filter member 43 and the second plate 47 will be described.

As shown in FIG. 11, the inspection unit 45 may further include an insertion member 88. The insertion member 88 may be disposed in at least one of a space between the filter member 43 and the first plate 46 and a space between the first plate 46 and the second plate 47. FIG. 11 illustrates a case in which the insertion member 88 is disposed between the filter member 43 and the first plate 46.

When the insertion member 88 is disposed between the filter member 43 and the first plate 46, the insertion member 88 may be coupled to the first plate 46 to face the filter member 43. Otherwise, the insertion member 88 may be coupled to the housing 41 to be located between the filter member 43 and the first plate 46.

The insertion member 88 may include at least one of a porous support, a hydrophobic filter, and an O-ring. The porous support may have a pore size not to allow the capillary phenomenon to occur. Preferably, the pore size of the porous support may be 1 mm or more. The insertion member 88 may have a hydrophobic property. Since most fluid samples have a hydrophilic property, when the insertion member 88 has a hydrophilic property, a fluid sample may be more easily absorbed such that a backflow of the fluid sample may be caused.

As shown in FIG. 12, a part of the housing 41 may be disposed between the filter member 43 and the first plate 46.

The housing 41 may include a filter member seating portion 95 on which the filter member 43 is seated. The filter member seating portion 95 may be formed to surround a part of one surface of the filter member 43 which faces the first plate 46. In detail, the filter member seating portion 95 may include a first frame 95a which surrounds a lateral surface of the filter member 43 and a second frame 95b which extends from the first frame 95a to surround the part of the one surface of the filter member 43 which faces the first plate 46.

When the inspection unit 45 is coupled to the housing 41, the filter member seating portion 95 may be located between the filter member 43 and the first plate 46. In detail, when the inspection unit 45 is coupled to the housing 41, the second frame 95b of the filter member seating portion 95 may be located between the filter member 43 and the first plate 46.

That is, the filter member seating portion 95 may correspond to the insertion member 88 described with reference to FIG. 11.

As shown in FIG. 13, the inspection unit 45 may be designed such that a thickness of the first plate 46 increases more. To describe another aspect, the inspection unit 45 may be designed such that the thickness of the first plate 46 may be thicker than a thickness of at least one of the second plate 47 and the third plate 48. In this case, the distance between the filter member 43 and the second plate 47 increases as much as an increase in the thickness of the first plate 46.

FIG. 14 is a cross-sectional view illustrating a part of a fluid analysis cartridge according to an eighth embodiment of the present invention, and FIG. 15 is a cross-sectional view illustrating a part of a fluid analysis cartridge according to a ninth embodiment of the present invention. FIG. 16 is a cross-sectional view illustrating a part of a fluid analysis cartridge according to a tenth embodiment of the present invention, and FIG. 17 is a cross-sectional view illustrating a part of a fluid analysis cartridge according to an eleventh embodiment of the present invention. Hereinafter, a description which overlaps with that of the fluid analysis cartridge 40 according to the first embodiment will be omitted. Also, like reference numerals refer to like components described in relation to the fluid analysis cartridge 40 according to the first embodiment. In FIG. 14, the fluid analysis cartridge according to the eighth embodiment is referred to as "700." In FIG. 15, the fluid analysis cartridge according to the ninth embodiment is referred to as "800." In FIG. 16, the fluid analysis cartridge according to the tenth embodiment is referred to as "900." In FIG. 17, the fluid analysis cartridge according to the seventh embodiment is referred to as "1000."

A backflow of the fluid sample supplied to the inspection unit 45 may occur in the flow path 47c or the inspection portion 47b formed at the second plate 47. Hereinafter, with reference to FIGS. 14 to 17, backflow-preventing structures formed at the flow path 47c to prevent the backflow of the fluid sample, which may occur at the flow path 47c or the inspection portion 47b will be described. The following backflow-preventing structures do not interrupt a normal flow of the fluid sample and are capable of preventing an abnormal flow, that is, the backflow of the fluid sample, which may be caused by the capillary phenomenon or the negative pressure.

As shown in FIG. 14, the backflow-preventing structures may include a first backflow-preventing structure 710 which selectively opens the flow path 47c. The first backflow-preventing structure 710 may include a check valve. The first backflow-preventing structure 710 may be coupled to the first plate 46. The first backflow-preventing structure 710 may include a flexible polymer membrane. The flexible polymer membrane may include PDMS, silicon, and the like. The first backflow-preventing structure 710 may be coupled to the first plate 46 using adhesives and the like. Also, the first backflow-preventing structure 710 may be coupled to the first plate 46 through plasma treatment.

As shown in FIG. 15, the backflow-preventing structures may include a second backflow-preventing structure 810 having a hydrophobic property. In detail, the second backflow-preventing structure 810 may have a hydrophobic porous membrane. The second backflow-preventing structure 810 may include a hydrophobic filter. The second backflow-preventing structure 810 may be coupled to at least one of the first plate 46 and the third plate 48 to be adjacent to the second inlet portion 47a.

The second backflow-preventing structure 810 may be integrated with the second plate 47 as a whole. For example, in a cutting process for forming the flow path 47c at the second plate having porosity, other parts, except a part corresponding to the second backflow-preventing structure 810, may be cut to manufacture the second backflow-preventing structure 810.

As shown in FIG. 16, the backflow-preventing structures may include a third backflow-preventing structure 910 which is formed on a bottom surface of the flow path 47c and interrupts a backflow of a fluid sample. The third backflow-preventing structure 910 may be formed by coating at least a part of the bottom surface of the flow path 47c with a hydrophobic material. The third backflow-preventing structure 910 may be integrated with the third plate 48 as a whole during a process of manufacturing the third plate 48. In detail, to block out light, a particular material (for example, carbon) is applied to areas of the inspection unit 45, except areas 46b and 48a corresponding to the inspection portion 47b. Here, hydrophobic carbon and the like may be patterned on at least a part of the bottom surface of the flow path 47c. Also, a variety of hydrophobic materials may be patterned using a chemical vapor deposition (CVD) process.

As shown in FIG. 17, the backflow-preventing structures may include a fourth backflow-preventing structure 1010 formed on the bottom surface of the flow path 47c to protrude toward the flow path 47c. The fourth backflow-preventing structure 1010 may include a pillar. The fourth backflow-preventing structure 1010 may be integrated with the third plate 48 which forms the bottom surface of the flow path 47c. In detail, the fourth backflow-preventing structure 1010 may be integrated with the third plate 48 as a whole through injection-molding. Also, the fourth backflow-preventing structure 1010 may be formed by an etching process which is one of a semiconductor manufacturing process.

Particular embodiments have been illustrated and described above. However, it should be appreciated by one of ordinary skill in the art that various changes may be made without departing from the technical concept of the present invention defined in the claims.

The invention claimed is:

1. A fluid analysis apparatus comprising:
a fluid analysis cartridge comprising:
a housing comprising:
a fluid supply portion configured to supply a fluid sample; and
a filter member configured to filter the fluid sample supplied by the fluid supply portion; and
an inspection unit coupled to the housing and configured to receive the fluid sample, which has passed through the filter member, for inspection, the inspection unit comprising:
a first plate having a first inlet opening which faces the filter member; and
a second plate stacked on the first plate and including a second inlet opening aligned with the first inlet opening, a plurality of transparent reservoirs, and a channel connecting the second inlet opening and the plurality of transparent reservoirs, the first inlet opening having a width that is smaller than a width of the second inlet opening; and
a third plate stacked on a lower surface of the second plate; and
a pressurizing member configured to pressurize the fluid analysis cartridge for moving the fluid sample which is supplied to the fluid supply portion to the inspection unit,
wherein the second inlet opening is a through-hole extending from an upper surface of the second plate to the lower surface of the second plate.

2. The fluid analysis apparatus of claim 1, wherein the inspection unit further comprises a fluid sample movement path provided along the lower surface of the first plate that is aligned with the channel of the second plate, the fluid sample movement path being configured to prevent the fluid sample supplied to the inspection unit from flowing back towards the filter.

3. The fluid analysis apparatus of claim 2, wherein at least a part of the fluid sample movement path has a hydrophobic property.

4. The fluid analysis apparatus of claim 2, wherein the fluid sample movement path comprises:
a first part which provides the first inlet opening; and
a second part which faces the second inlet opening and is connected to the first part, and
wherein at least a part of the second part is coated with a hydrophobic material.

5. The fluid analysis apparatus of claim 2, wherein at least a part of the fluid sample movement path has unevenness provided thereon.

6. The fluid analysis apparatus of claim 2, wherein at least a part of the fluid sample movement path has at least one backflow-preventing protrusion provided thereon which protrudes toward at least one of the first inlet opening and the second inlet opening.

7. The fluid analysis apparatus of claim 1, wherein the filter member comprises glass fiber.

8. The fluid analysis apparatus of claim 1, wherein the inspection unit further comprises a micro space provided between the first plate and the second plate.

9. The fluid analysis apparatus of claim 8, wherein the inspection unit further comprises a fluid sample movement path which is provided along the lower surface of the first plate to connect the micro space to the filter member and has at least a part having a hydrophobic property to prevent the fluid sample accommodated in the micro space from flowing back toward the filter member.

10. The fluid analysis apparatus of claim 1, wherein an inner surface of the first inlet opening has a fluid affinity that is different than a fluid affinity of an adjacent surface of the first plate that is facing the second inlet opening.

11. The fluid analysis apparatus of claim 1, wherein the first plate defines a plurality of openings that are aligned with the plurality of transparent reservoirs.

12. The fluid analysis apparatus of claim 1, wherein the first inlet opening and the second inlet opening have a circular shape, and the first inlet opening has a diameter that is smaller than a diameter of the second inlet opening.

* * * * *